United States Patent Office 3,355,921
Patented Dec. 5, 1967

3,355,921
SHAPING STAND FOR THE PRODUCTION OF HELICALLY WELDED TUBES
Hans Pferdekämper, Dusseldorf, Germany, assignor to Schloemann Aktiengesellschaft, Dusseldorf, Germany, a German company
Filed Dec. 16, 1964, Ser. No. 418,782
Claims priority, application Germany, Dec. 27, 1963, Sch 34,387
2 Claims. (Cl. 72—171)

ABSTRACT OF THE DISCLOSURE

A shaping stand for the production of helically welded tubes, comprising bending means, and also comprising adjustable guiding rollers assembled in pairs in four roller units horizontally and vertically opposite to one another, the rollers being carried by vertically adjustable transverse members of a gantry-like housing, and the rollers also being individually adjustable in straight lines directed approximately towards the axis of the tube to be formed.

Figure 1:
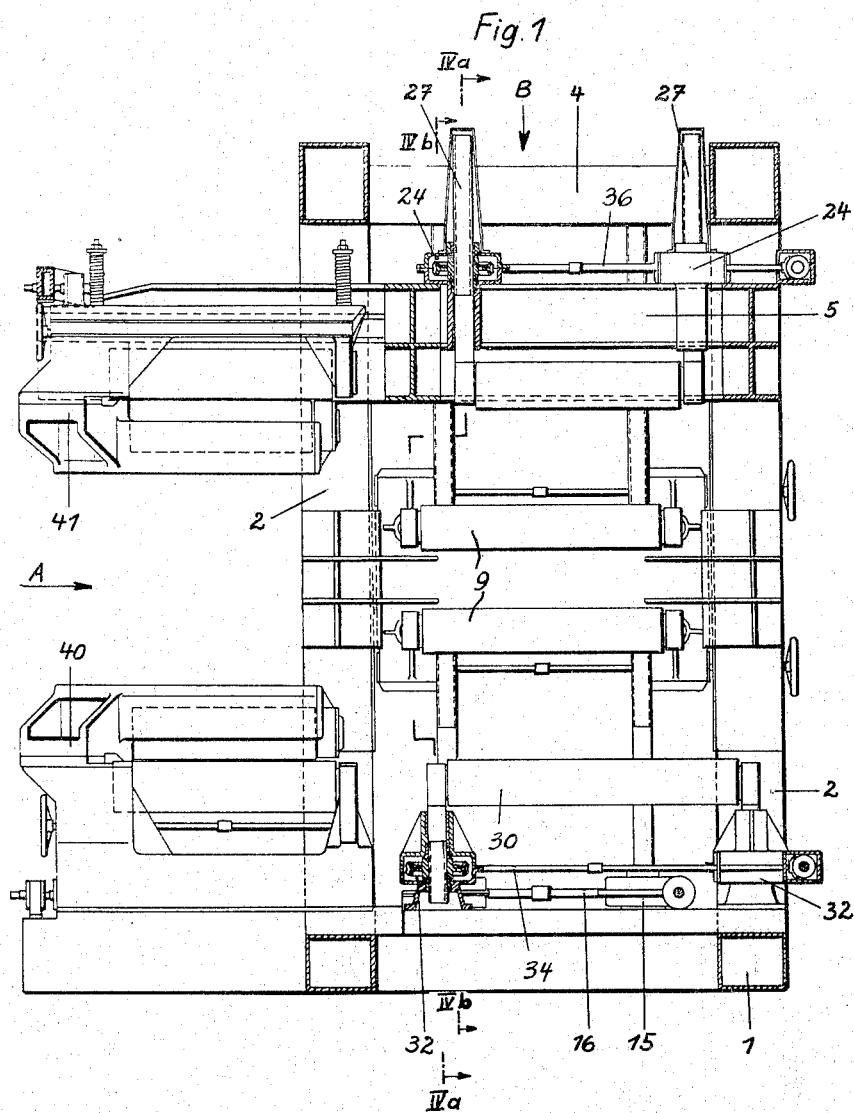

Screw-threaded spindles are preferably provided for vertically adjusting the transverse members that carry the rollers, the pitch of those that carry the lateral rollers being half as great as the pitch of those that carry the upper rollers. The bending means may be duplicated to produce a tube from two metal strips, and in this case one of the bending devices is structurally combined with one of the adjustable transverse members.

---

Shaping stands for the production of helically welded pipes consist essentially of a bending unit and a guiding or centering unit, the welding equipment being arranged in the region of the guiding or centering unit. As a guiding or centering unit, roller baskets or gantry-like housings, with intermediate pieces, are employed in a known manner. Since, on grounds of strength, the guiding rollers arranged in the roller basket can only be temporarily adjusted, with a tube programme of tubes varying greatly in diameter, a relatively large number of roller baskets, adapted to the various tube diameters, must be kept ready. When guiding devices constructed as gantry-like housings are employed, it is necessary, in the production of tubes of larger or smaller diameters, to adapt the housings from time to time to the fresh tube dimension by putting in or taking out intermediate pieces, which may in some cases be additionally provided with guide rollers.

The object of this invention is to provide for the shaping stand a guiding or centering device in which an adaptation of the guiding rollers is effected without exchanging members that form the guiding device; and, in addition to this, to render it practicable to change over to a different tube diameter in a short time. A start is here made from a shaping stand constructed as a gantry-like housing, the guiding or centering unit of which consists of a number of adjustable guiding rollers arranged in fairly uniform distribution in the region of the gantry-like housing.

The invention consists in the feature that the rollers that guide the tube laterally are arranged on cross-bars adjustable in height upon the longitudinal spars of the housing, and the rollers that guide the tube above and/or below are arranged upon a frame which is vertically adjustable upon the longitudinal spars. The cross-bars and the frame that carry the guiding rollers, preferably receive a common adjusting drive. The adjusting of the cross-bars and of the frame in the housing may advantageously be effected by means of screw-threaded spindles, which are divided into two ranges, of which one range is designed for the frame and the other for the cross-bars, and the pitch or spacing of the range of spindles designed for the cross-bars is half as great as that of the range of spindles designed for the frame. Owing to the fact that the pitch or spacing of the spindles for the cross-bars is made only half as great as that for the frame, a central position for the lateral rollers for the tube is always ensured when adjusting these members.

In a further development of the invention, in the spacing stand with a lower bending device and an upper bending device for the production of helically welded tubes from two strips, the frame adjustable in height forms a common structural member with one of the bending devices.

Figure 2:
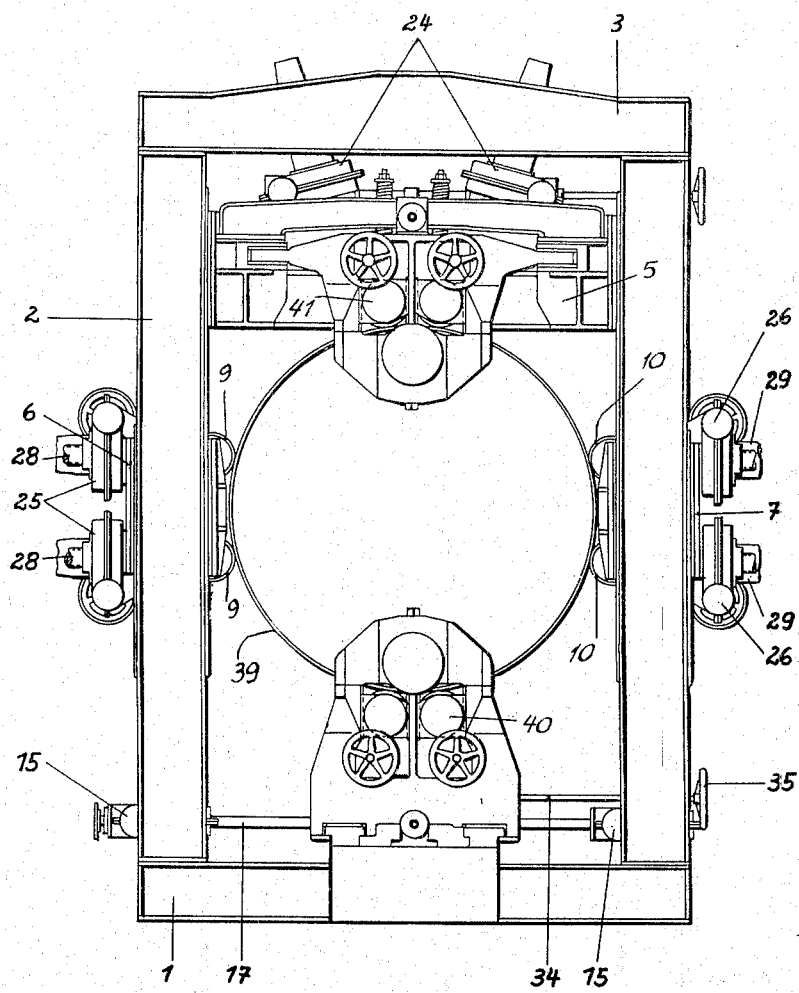
Figure 3:
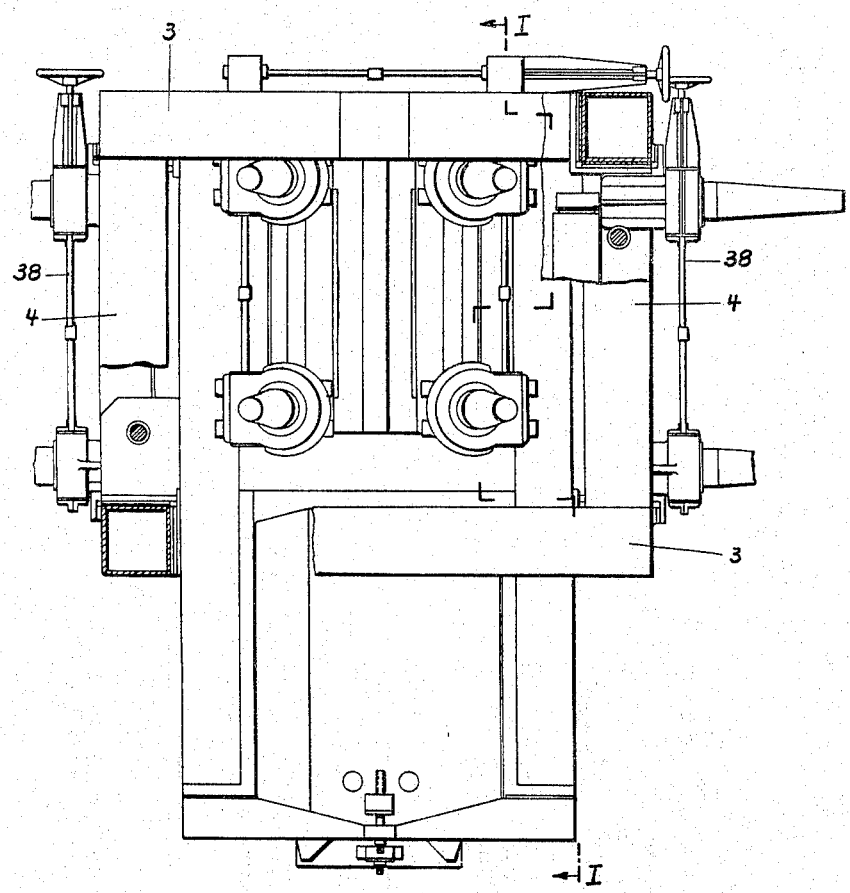
Figure 4:
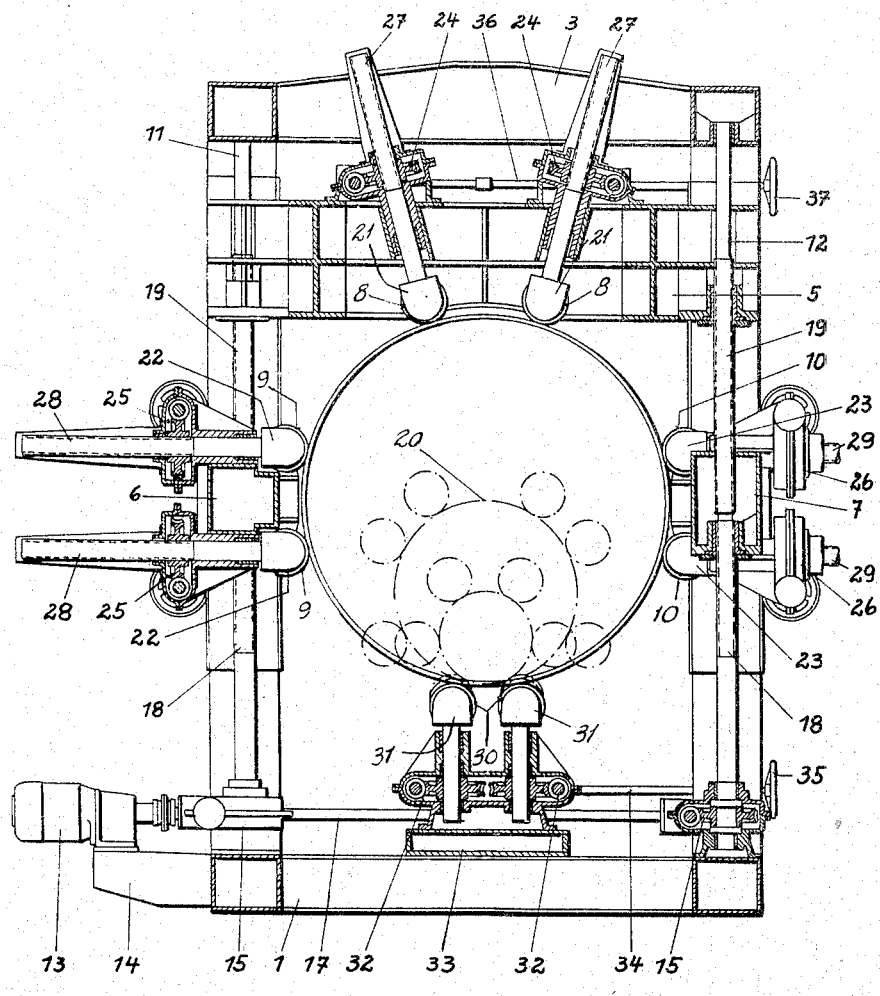

One constructional example of the invention is illustrated in the accompanying drawings, in which:

FIGURE 1 shows a section on the line I—I in FIGURE 3;
FIGURE 2 is a view looking in the direction A of FIGURE 1;
FIGURE 3 is a plan view looking in the direction B of FIGURE 1; and
FIGURE 4 shows partial sections on the lines IVa and IVb in FIGURE 1.

In the drawings, 1 denotes the base frame, which, together with the longitudinal spars 2, the transverse yokes 3 and the connecting struts 4, forms the gantry-like housing. On the longitudinal spars 2 are arranged a frame 5, and also cross-bars 6 and 7, as holding means for the guiding rollers 8, 9 and 10, which are slidingly guided in a longitudinal direction. The adjustment in height of the cross-bars 6 and 7 and of the frame 5 is effected by means of the pairs of screw-threaded spindles 11 and 12, which are rotatably journalled in the housing. The driving of the two pairs of threaded spindles is effected by an electric motor 13, which is secured by means of a bracket 14 in the base frame. The adjusting of the pairs of threaded spindles is effected by means of the worm gears 15, which are coupled together by means of the longitudinal spindles 16 and the transverse spindle 17. The pitch of the spindle thread 18 for the cross-bars is half as great as the pitch of the spindle thread 19 for the frame 5. The result is thereby obtained, when adjusting the height of the frame and the cross-bars, that the guiding rollers 9 and 10, in every position, are located exactly or approximately centrally to the tube axis 20. The guiding rollers are journalled in carrying arms 21, 22 and 23, which are secured to screw-threaded spindles 27, 28 and 29, which are manually adjustable by means of worm gears 24, 25 and 26. The lower guiding rollers 30 are journalled in carrying arms 31, which are secured to threaded spindles which are collectively adjustable by hand by means of the worm gears 32. The worm gears 32 are stationarily secured upon the base plate 33. The worm gears 32 serving for the adjusting of the guiding rollers 30 are coupled together, both side by side and one behind another, by spindles 34, so that upon a shifting of the hand-wheel 35, the two rollers are uniformly adjusted in height. Similarly, the worm gears 24 provided for the adjusting of the upper guiding rollers 8 are coupled to one another by means of spindles 36, so that these guiding rollers also, upon the hand-wheel 37 being shifted, may be collectively and uniformly adjusted. In the case of the lateral guiding rollers 9 and 10, only the two worm gears 25 and 26 designed for one guiding roller are coupled together by spindles 38, so that each guiding roller can be adjusted individually to the periphery of the tube 39.

On the entry side a lower bending device 40 and an upper bending device 41 are arranged. Helically welded tubes formed from two strips can thereby be produced. The upper bending device 41 forms a common constructional member with the frame 5 for the upper guiding rollers 8. With an adjustment in the height of the frame 5 the upper bending device is thereby also at the same time brought to the requisite height.

I claim:

1. A shaping stand for the production of helically welded tubes from strip metal, comprising: bending means, a gantry-like housing including a base frame, vertical longitudinal spars, and transverse members each vertically adjustable along the said spars, four pairs of guiding and centering rollers distributed around the position in which the tube in formation will be located, the axes of the rollers being parallel to the axis of the said tube to be formed, one of the pairs of rollers being located vertically below the said axis, another pair vertically above the said axis, and the two remaining pairs being located opposite to one another, one pair on each side of the said axis, the upper and lateral pairs of rollers being rotatably mounted on the vertically adjustable transverse members, and the individual rollers also being adjustable, relatively to the transverse members that carry them, in straight lines directed approximately towards the axis of the tube in formation.

2. A shaping stand as claimed in claim 1, further comprising screw-threaded spindles for vertically adjusting the transverse members, the pitch of the spindles that actuate the transverse members carrying the lateral pairs of rollers being half as great as the pitch of the spindles carrying the upper pair of rollers.

References Cited

UNITED STATES PATENTS

| | | | |
|---|---|---|---|
| 3,092,056 | 6/1963 | Ohnstad | 72—171 |
| 3,093,103 | 6/1963 | Berkeley | 228—17 |

CHARLES W. LANHAM, *Primary Examiner.*

K. C. DECKER, *Assistant Examiner.*